United States Patent
Yoshikawa et al.

(10) Patent No.: US 11,732,099 B2
(45) Date of Patent: Aug. 22, 2023

(54) RESIN PARTICLES

(71) Applicant: FUJIFILM Business Innovation Corp., Tokyo (JP)

(72) Inventors: Hideaki Yoshikawa, Kanagawa (JP); Kenji Yao, Kanagawa (JP); Masahiro Oki, Kanagawa (JP); Kazusei Yoshida, Kanagawa (JP); Tetsuya Taguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/506,677

(22) Filed: Oct. 21, 2021

(65) Prior Publication Data

US 2022/0306823 A1 Sep. 29, 2022

(30) Foreign Application Priority Data

Mar. 25, 2021 (JP) ................ 2021-052445

(51) Int. Cl.
*C08J 7/04* (2020.01)
*C08K 5/11* (2006.01)

(52) U.S. Cl.
CPC .......... *C08J 7/042* (2013.01); *C08J 2301/10* (2013.01); *C08J 2479/02* (2013.01); *C08K 5/11* (2013.01)

(58) Field of Classification Search
None
See application file for complete search history.

(56) References Cited

U.S. PATENT DOCUMENTS

| | | | | |
|---|---|---|---|---|
| 9,458,342 | B2* | 10/2016 | Kodama | C09D 151/06 |
| 2013/0184415 | A1* | 7/2013 | Yoshikawa | C08L 101/16 |
| | | | | 525/450 |
| 2022/0153996 | A1 | 5/2022 | Motomura et al. | |

FOREIGN PATENT DOCUMENTS

| | | |
|---|---|---|
| CN | 1134433 | 10/1996 |
| EP | 2180374 | 4/2010 |
| EP | 3111928 | 1/2017 |
| JP | 2004256579 | 9/2004 |
| JP | 2009249577 | 10/2009 |
| JP | 5633291 | 12/2014 |
| JP | 5829393 | 12/2015 |
| WO | 2020189485 | 9/2020 |

OTHER PUBLICATIONS

"Search Report of Europe Counterpart Application", dated Jun. 2, 2022, p. 1-p. 7.

* cited by examiner

*Primary Examiner* — Ronak C Patel
(74) *Attorney, Agent, or Firm* — JCIPRNET

(57) ABSTRACT

Resin particles include mother particles containing a biodegradable resin, in which an alkali metal atomic weight A present on a resin particle surface with respect to a total atomic weight present on the resin particle surface, which is measured by an X-ray photoelectron spectroscopy, and an alkali metal atomic weight B present in the resin particles with respect to the total atomic weight present on the resin particles, which is measured by a fluorescent X-ray spectroscopy, satisfy a relationship of $0 \leq (A/B) < 0.15$ and $0.005$ atomic $\% \leq B \leq 0.5$ atomic %.

9 Claims, No Drawings

RESIN PARTICLES

CROSS-REFERENCE TO RELATED APPLICATIONS

This application is based on and claims priority under 35 USC 119 from Japanese Patent Application No. 2021-052445 filed Mar. 25, 2021.

BACKGROUND

(i) Technical Field

The present invention relates to resin particles.

(ii) Related Art

JP5633291B suggests "a biodegradable resin composition including a poorly hydrolyzable biodegradable resin (A), an ester decomposition accelerator (B) consisting of an easily hydrolyzable polymer, and an ester decomposition accelerator aid (C) consisting of inorganic particles that accelerate hydrolysis of the ester decomposition accelerator, in which the ester decomposition accelerator (B) is contained in an amount of 0.01 to 30 parts by weight per 100 parts by weight of the biodegradable resin (A), and the ester decomposition accelerator aid (C) is contained in an amount of 28 to 200 parts by weight per 100 parts by weight of the ester decomposition accelerator (B)".

JP5829393B suggests "a biodegradable resin composition including polylactic acid (A), polyglycolic acid (B), and calcium carbonate particles (C) as an ester decomposition accelerator aid, in which a content of the polyglycolic acid (B) is 1 to 10 parts by mass per 100 parts by mass of the polylactic acid (A), and a content of the calcium carbonate particles (C) is 30 to 100 parts by mass per 100 parts by mass of the polyglycolic acid (B)".

JP2009-249577A suggests "a resin composition including a polyester resin having biodegradability and a compound NaX (1) represented by General Formula (1) as a crystal nucleating agent (in the formula, X represents a halogen atom), in which the compound represented by General Formula (1) is dispersed in the polyester resin in the form of particles having an average particle size of 10 μm or less".

SUMMARY

Aspects of non-limiting embodiments of the present disclosure relate to resin particles including mother particles containing a biodegradable resin, the resin particles having biodegradability and excellent storage properties in a solution containing water, compared to a case where an alkali metal atomic weight A present in a resin particle surface with respect to a total atomic weight present in the resin particle surface, which is measured by an X-ray photoelectron spectroscopy, and an alkali metal atomic weight B present in the resin particles with respect to the total atomic weight present in the resin particles, which is measured by a fluorescent X-ray spectroscopy, satisfy a relationship of (A/B)>0.15, 0.005 atomic %>B, or B>0.5 atomic %, or a case where an alkali metal atomic weight [AL1] on a resin particle surface, which is measured by an X-ray photoelectron spectroscopy, an alkali metal atomic weight [AL2] on a surface after etching a range of 2 mm square of the resin particle surface with an argon gas cluster ion gun of an output of 5 kV for 5 minutes, and an alkali metal atomic weight [AL3] on a surface after etching a range of 2 mm square of the resin particle surface with an argon gas cluster ion gun of an output of 5 kV for 30 minutes satisfy [AL1]>[AL2] and [AL1]>[AL3].

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The object is addressed by the following means.

According to an aspect of the present disclosure, there are provided resin particles including mother particles containing a biodegradable resin, in which an alkali metal atomic weight A present on a resin particle surface with respect to a total atomic weight present on the resin particle surface, which is measured by an X-ray photoelectron spectroscopy, and an alkali metal atomic weight B present in the resin particles with respect to the total atomic weight present on the resin particles, which is measured by a fluorescent X-ray spectroscopy, satisfy a relationship of $0 \leq (A/B) < 0.15$ and $0.005$ atomic $\% \leq B \leq 0.5$ atomic %.

DETAILED DESCRIPTION

Hereinafter, exemplary embodiments of the present invention will be described. These descriptions and examples illustrate exemplary embodiments and do not limit the scope of the invention.

In the numerical value range described stepwise in the present specification, an upper limit value or a lower limit value described in one numerical value range may be substituted with an upper limit value or a lower limit value of another numerical value range described stepwise. In addition, in the numerical value range described in the present specification, the upper limit value or the lower limit value of the numerical value range may be substituted with the value shown in the exemplary embodiments.

Each component may contain a plurality of substances.

In a case of referring to an amount of each component in a composition, in a case where a plurality of substances corresponding to each component is present in the composition, unless otherwise specified, the amount means a sum of the plurality of substances present in the composition.

Resin Particles

The resin particles according to a first embodiment have mother particles containing a biodegradable resin, in which an alkali metal atomic weight A (hereinafter, simply referred to as "atomic weight A") present on a resin particle surface with respect to a total atomic weight present on the resin particle surface, which his measured by an X-ray photoelectron spectroscopy, and an alkali metal atomic weight B (hereinafter, simply referred to as "atomic weight B") present in the resin particles with respect to the total atomic weight present on the resin particles, which is measured by a fluorescent X-ray spectroscopy, satisfy a relationship of $0 \leq (A/B) < 0.15$ and $0.005$ atomic $\% \leq B \leq 0.5$ atomic %.

Due to the configuration, the resin particles according to a first embodiment have biodegradability and excellent storage properties in a solution containing water. The reason is presumed as follows.

Resin particles containing a biodegradable resin (hereinafter, also referred to as biodegradable resin particles) are contained in a solution containing water depending on the use. However, biodegradable resin particles are susceptible to hydrolysis in a solution containing water. Therefore, the biodegradable resin particles may have insufficient storage properties in a solution containing water.

Although the reason is unclear, in a case where an alkali metal is contained in biodegradable resin particles, hydrolysis tends to be accelerated in a solution containing water. The storage properties of the biodegradable resin particles in a solution containing water tend to depend on the likelihood of hydrolysis of the biodegradable resin particle surface. Therefore, as the alkali metal is contained on the biodegradable resin particle surface, the storage properties of the biodegradable resin particles in the solution containing water deteriorate.

In the resin particles according to the first embodiment, the atomic weight A and the atomic weight B satisfy a relationship of $0 \leq (A/B) \leq 0.15$ and $0.005$ atomic $\% \leq B \leq 0.5$ atomic %. As the resin particles satisfy $0 \leq (A/B) < 0.15$, an amount of the alkali metal present near the resin particle surface decreases. Therefore, hydrolysis of the resin particle surface is less likely to occur. With this, the storage properties in a solution containing water improve.

On the other hand, as the resin particles satisfy the relationship of $0.005$ atomic $\% \leq B \leq 0.5$ atomic %, an alkali metal is contained inside the resin particles. The alkali metal also tends to accelerate the biodegradability of the biodegradable resin, thereby ensuring the biodegradability of the resin particles.

From the above, it is presumed that the resin particles according to the first embodiment have biodegradability and excellent storage properties in a solution containing water due to the configuration.

Resin particles according to a second embodiment have mother particles containing a biodegradable resin, in which an alkali metal atomic weight [AL1] on a resin particle surface, which is measured by an X-ray photoelectron spectroscopy, an alkali metal atomic weight [AL2] on a surface after etching a range of 2 mm square of the resin particle surface with an argon gas cluster ion gun of an output of 5 kV for 5 minutes, and an alkali metal atomic weight [AL3] on a surface after etching a range of 2 mm square of a resin particle surface with an argon gas cluster ion gun of an output of 5 kV for 30 minutes, satisfies a relationship of [AL1]<[AL3]<[AL2].

Due to the configuration, the resin particles according to the second embodiment have biodegradability and excellent storage properties in a solution containing water. The reason is presumed as follows.

Here, [AL1] represents an alkali metal atomic weight in a region near the resin particle surface, [AL2] represents an alkali metal atomic weight in a region near 100 nm in a depth direction from the resin particle surface, and [AL3] represents an alkali metal atomic weight in a region near the center of the resin particles. Therefore, by satisfying a relationship of [AL1]<[AL3]<[AL2], the amount of the alkali metal present near the resin particle surface is the smallest for the alkali metal. With this, the storage properties in a solution containing water improve. In addition, by increasing the amount of the alkali metal atomic weight in the region near 100 nm in the depth direction from the resin particle surface to the maximum, the biodegradation is accelerated when the biodegradation proceeded to the region. In addition, by increasing the alkali metal atomic weight in the region near the center of the resin particles to a second largest, it becomes easy to ensure the accelerated biodegradation.

From the above, it is presumed that the resin particles according to the second embodiment have biodegradability and excellent storage properties in a solution containing water due to the configuration.

Hereinafter, the resin particles corresponding to any one of the resin particles according to the first or second embodiment will be described in detail. However, an example of the resin particles of the present invention may be resin particles corresponding to any one of the resin particles according to the first or second embodiment.

Mother Particles

Biodegradable Resin

Mother particles contain a biodegradable resin.

Examples of the mother particles include particles containing a biodegradable resin as a major component, and specific examples thereof include 90% by mass, 95% by mass, 98% by mass, or 100% by mass of the biodegradable resin with respect to the total amount of the mother particles.

Here, the biodegradable resin is a resin that is decomposed into water and carbon dioxide by microorganisms. Specifically, the biodegradable resin means a resin in which the biodegradation rate under aerobic conditions measured by a method according to ISO-14855-2 (2018) is 50% or more in one month.

Examples of the biodegradable resin include cellulose acylate, polyester, natural polymers, and the like.

Cellulose acylate is a cellulose derivative in which at least a part of hydroxy groups in cellulose is substituted (acylated) with an acyl group. The acyl group is a group having a structure of $-CO-R^{AC}$ ($R^{AC}$ represents a hydrogen atom or a hydrocarbon group). Examples of the cellulose acylate include a cellulose derivative represented by General Formula (CA).

Examples of the polyester include an aliphatic polyester, an aliphatic aromatic polyester, and the like.

Examples of the aliphatic polyester include polyhydroxyalkanoic acid such as polylactic acid (PLA), polyglycolic acid (PGA) polyhydroxybutyrate, poly (3-hydroxybutyrate-co-3-hydroxyhexanoate) (PHBH), polycaprolactone, polybutylene succinate (PBS), polybutylene succinate/adipate (PBSA), and polyethylene succinate (PBA); and the like.

Examples of the aliphatic aromatic polyester include polybutylene adipate/terephthalate copolymer resin (PBAH), polytetramethylene adipate/terephthalate copolymer resin, and the like.

Examples of natural polymers include starch, cellulose, chitin, chitosan, gluten, gelatin, zein, soybean protein, collagen, keratin, and the like.

The biodegradable resin is, for example, preferably cellulose acylate, from a viewpoint of improving biodegradability.

Cellulose Acylate

Cellulose acylate is, for example, a cellulose derivative represented by General Formula (CA).

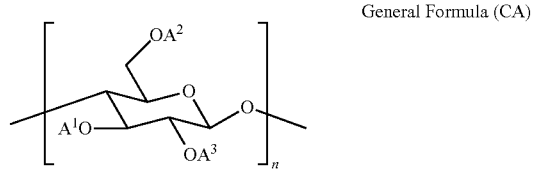

General Formula (CA)

In General Formula (CA), A1, A2, and A3 each independently represent a hydrogen atom or an acyl group, and n represents an integer of 2 or more. However, at least a part of n A1s, n A2s, or n A3s represents an acyl group. The n A1s in a molecule may be all the same, partially the same, or different from each other. Similarly, the n A2s and n A3s in the molecule may be all the same, partially the same, or different from each other.

In the acyl group represented by A1, A2, and A3, a hydrocarbon group in the acyl group may be linear, branched, or cyclic, but the acyl group is, for example, preferably linear or branched, and more preferably linear.

As the acyl group represented by A1, A2, and A3, the hydrocarbon group in the acyl group may be a saturated hydrocarbon group or an unsaturated hydrocarbon group, but the acyl group is, for example, more preferably a saturated hydrocarbon group.

The acyl group represented by A1, A2, and A3 is, for example, preferably an acyl group having 1 to 6 carbon atoms. That is, as the cellulose acylate, for example, a cellulose acylate having an acyl group having 1 or more and 6 or less carbon atoms is preferable.

The acyl group represented by A1, A2, and A3 may be a group in which a hydrogen atom in the acyl group is substituted with a halogen atom (for example, a fluorine atom, a bromine atom, an iodine atom), an oxygen atom, or a nitrogen atom, but, for example, is preferably not substituted.

Examples of the acyl group represented by A1, A2, and A3 include a formyl group, an acetyl group, a propionyl group, a butyryl group (butanoyl group), a propenoyl group, a hexanoyl group, and the like. Among these, as the acyl group, an acyl group having two or more and four or less carbon atoms is, for example, more preferable, and an acyl group having two or three carbon atoms is further more preferable, from a viewpoint of improving the biodegradation rate of the resin particles.

Examples of the cellulose acylate include cellulose acetate (cellulose monoacetate, cellulose diacetate (DAC), cellulose triacetate), cellulose acetate propionate (CAP), cellulose acetate butyrate (CAB), and the like.

As the cellulose acylate, cellulose acylate having two or more acyl groups is, for example, preferable from a viewpoint of improving the biodegradation rate of the resin particles. Specifically, as the cellulose acylate, cellulose acetate, cellulose acetate propionate (CAP), and cellulose acetate butyrate (CAB) are, for example, preferable, cellulose acetate propionate (CAP) is more preferable, and cellulose acetate butyrate (CAB) is further more preferable, from a viewpoint of improving the biodegradation rate of the resin particles.

Cellulose acylate having two or more of acyl groups tend to have a high biodegradation rate. Therefore, by using cellulose acylate having two or more of acyl groups, the biodegradability is more easily maintained even for resin particles having a small amount of alkali metal on the particle surface.

Since cellulose acetate butyrate tends to have a particularly high biodegradation rate, the biodegradability is more likely to be improved by using cellulose acetate butyrate.

One of cellulose acylate may be used alone, or two or more may be used in combination.

A weight average polymerization degree of cellulose acylate is, for example, preferably 200 or more and 1,000 or less, more preferably 500 or more and 1,000 or less, and further more preferably 600 or more and 1,000 or less.

The weight average polymerization degree of cellulose acylate is obtained from the weight average molecular weight (Mw) by the following procedure.

First, the weight average molecular weight (Mw) of cellulose acylate is measured by gel permeation chromatography (GPC apparatus: manufactured by Tosoh Corporation, HLC-8320GPC, column: TSKgel α-M) in terms of polystyrene using tetrahydrofuran.

Subsequently, the polymerization degree of cellulose acylate is obtained by dividing by a structural unit molecular weight of cellulose acylate. For example, in a case where a substituent of cellulose acylate is an acetyl group, the structural unit molecular weight is 263 when a substitution degree is 2.4, and 284 when the substitution degree is 2.9.

A substitution degree of cellulose acylate is, for example, preferably 2.1 or more and 2.9 or less, more preferably 2.2 or more and 2.9 or less, further more preferably 2.3 or more and 2.9 or less, and particularly preferably 2.6 or more and 2.9 or less, from a viewpoint of improving the biodegradation rate of the resin particles.

In cellulose acetate propionate (CAP), a ratio of the substitution degree of the acetyl group to the propionyl group (acetyl group/propionyl group) is, for example, preferably 0.01 or more and 1 or less, and more preferably 0.05 or more and 0.1 or less, from a viewpoint of improving the biodegradation rate of the resin particles.

In cellulose acetate butyrate (CAB), a ratio of the substitution degree of the acetyl group to the butyryl group (acetyl group/butyryl group) is, for example, preferably 0.05 or more and 3.5 or less, and more preferably 0.5 or more and 3.0 or less, from a viewpoint of improving the biodegradation rate of the resin particles.

The substitution degree of cellulose acylate is an index indicating a degree to which a hydroxy group of cellulose is substituted with an acyl group. That is, the substitution degree is an index indicating a degree of acylation of cellulose acylate. Specifically, the substitution degree means an intramolecular average number of substitutions in which three hydroxy groups in a D-glucopyranose unit of cellulose acylate are substituted with acyl groups. The substitution degree is obtained by 1H-NMR (JMN-ECA/manufactured by JEOL RESONANCE Inc. from an integral ratio of peaks of cellulose-derived hydrogen and acyl group-derived hydrogen.

One biodegradable resin may be used alone, or a plurality of thereof may be used in combination.

A content of cellulose acylate is, for example, preferably 50% by mass or more with respect to a total amount of the mother particles. Cellulose acylate tends to have a high biodegradation rate. Therefore, by setting the content of cellulose acylate to the range, biodegradability is more easily maintained even for resin particles having a small amount of alkali metal on the particle surface.

Plasticizer

The mother particles may contain a plasticizer.

Examples of the plasticizer include ester compound, cardanol compound, camphor, metal soap, polyol, polyalkylene oxide, and the like. The plasticizer is, for example, preferably at least one of an ester compound or a cardanol compound from a viewpoint of improving mechanical properties of the resin particles. One plasticizer may be used alone, or two or more thereof may be used in combination.

Examples of the ester compound include fatty acid ester (adipic acid ester, citric acid ester, sebacic acid ester, azelaic acid ester, phthalic acid ester, acetic acid ester), phosphoric acid ester, condensed phosphoric acid ester, glycol ester (for example, benzoic acid glycol ester), modified body of fatty acid ester (for example, epoxidized fatty acid ester), and the like. Examples of the ester include monoester, diester, triester, polyester, and the like. Among these, dicarboxylic acid diester (adipic acid diester, sebacic acid diester, azelaic acid diester, phthalic acid diester, and the like) is, for example, preferable.

The plasticizer is, for example, preferably an adipic acid ester. Adipic acid ester has a high affinity for cellulose acylate, and by being dispersed in a state uniformly close to cellulose acylate, thermal fluidity is further improved as compared with other plasticizers.

As the adipic acid ester, a mixture of the adipic acid ester and components other than adipic acid ester may be used. Examples of commercially available products of the mixture include Daifatty101 manufactured by Daihachi Chemical Industry Co., Ltd., and the like.

Examples of fatty acid ester such as citric acid ester, sebacic acid ester, azelaic acid ester, phthalic acid ester, and acetic acid ester include esters of fatty acid and alcohol. Examples of the alcohol include monohydric alcohols such as methanol, ethanol, propanol, butanol, and 2-ethylhexanol; polyhydric alcohols such as glycerin, polyglycerin (diglycerin and the like), pentaerythritol, ethylene glycol, diethylene glycol, propylene glycol, butylene glycol, trimethylolpropane, trimethylolethane, and sugar alcohol; and the like.

Examples of the glycol in the benzoic acid glycol ester include ethylene glycol, diethylene glycol, propylene glycol, and the like.

The epoxidized fatty acid ester is an ester compound having a structure in which carbon-carbon unsaturated bond of the unsaturated fatty acid ester is epoxidized (that is, oxacyclopropane). Examples of the epoxidized fatty acid ester include esters of fatty acid and alcohol in which a part or all of the carbon-carbon unsaturated bonds in the unsaturated fatty acid (for example, oleic acid, palmitoleic acid, vaccenic acid, linoleic acid, linolenic acid, nervonic acid, and the like) is epoxidized. Examples of the alcohol include monohydric alcohols such as methanol, ethanol, propanol, butanol, and 2-ethylhexanol; polyhydric alcohols such as glycerin, polyglycerin (diglycerin and the like), pentaerythritol, ethylene glycol, diethylene glycol, propylene glycol, butylene glycol, trimethylolpropane, trimethylolethane, and sugar alcohol; and the like.

The ester compound as a plasticizer has a molecular weight (or weight average molecular weight) of, for example, preferably 200 or more and 2,000 or less, more preferably 250 or more and 1,500 or less, and further more preferably 280 or more and 1,000 or less. Unless otherwise specified, the weight average molecular weight of the ester compound is a value measured according to a method for measuring the weight average molecular weight of cellulose acylate.

The plasticizer is not limited and the cardanol compound is, for example, preferably used.

The cardanol compound refers to a component contained in a naturally-derived compound made from cashew (for example, a compound represented by Structural Formulae (b-1) to (b-4)) or a derivative from the component.

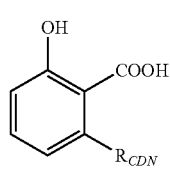

(b-1)

-continued

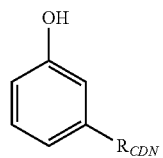

(b-2)

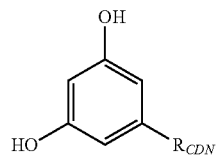

(b-3)

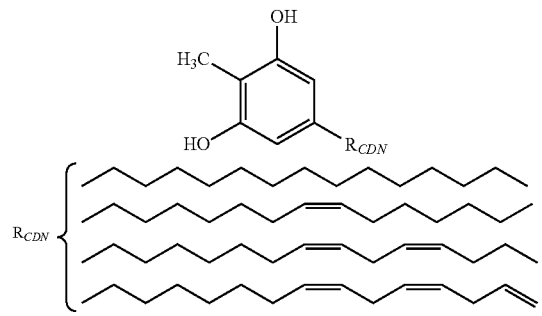

(b-4)

The cardanol compound may be a mixture of the naturally-derived compound made from cashew (hereinafter, also referred to as "cashew-derived mixture").

The cardanol compound may be a derivative from a cashew-derived mixture. Examples of the derivative from the cashew-derived mixture include the following mixtures or monomers, for example.

A mixture in which a composition ratio of each component in the cashew-derived mixture is adjusted A monomer obtained by isolating only specific components from a cashew-derived mixture A mixture which contains a modified body obtained by modifying the components in the cashew-derived mixture A mixture that contains a polymer obtained by polymerizing components in a cashew-derived mixture A mixture that contains a modified polymer obtained by modifying and polymerizing components in a cashew-derived mixture A mixture that contains a modified body obtained by further modifying components in the mixture having the adjusted composition ratio A mixture that contains a polymer obtained by further polymerizing the components in the mixture having the adjusted composition ratio A mixture that contains a modified polymer obtained by further modifying and polymerizing the components in the mixture having the adjusted composition ratio A modified body obtained by further modifying the isolated monomer A polymer obtained by further polymerizing the isolated monomer A modified polymer obtained by further modifying and polymerizing the isolated monomer Here, it is assumed that the monomer also includes multimers such as dimer and trimer The cardanol compound is, for example, preferably at least one compound selected from the group consisting of a compound represented by General Formula (CDN1) or a polymer obtained by polymerizing the compound represented by General Formula (CDN1), from a viewpoint of improving the biodegradation rate of the resin particles.

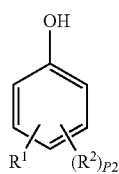

General Formula (CDN1)

In General Formula (CDN1), $R^1$ represents an alkyl group that may have a substituent or an unsaturated aliphatic group that has a double bond and may have a substituent. $R^2$ represents a hydroxy group, a carboxy group, an alkyl group that may have a substituent, or an unsaturated aliphatic group that has a double bond and may have a substituent. P2 represents an integer of 0 or more and 4 or less. $R^2$ present in plural numbers in a case where P2 is 2 or more may be the same groups or may be different groups.

In General Formula (CDN1), the alkyl group that may have a substituent represented by $R^1$ is, for example, preferably an alkyl group having 3 or more and 30 or less carbon atoms, more preferably an alkyl group having 5 or more and 25 or less carbon atoms, and further more preferably an alkyl group having 8 or more and 20 or less carbon atoms.

Examples of the substituent include a hydroxy group; a substituent containing an ether bond such as an epoxy group and a methoxy group; a substituent containing an ester bond such as an acetyl group and a propionyl group; and the like.

Examples of alkyl group that may have a substituent include a pentadecane-1-yl group, a heptane-1-yl group, an octane-1-yl group, a nonane-1-yl group, a decane-1-yl group, an undecane-1-yl group, a dodecane-1-yl group, a tetradecane-1-yl group, and the like.

In General Formula (CDN1), the unsaturated aliphatic group that has a double bond represented by $R^1$ and may have a substituent is, for example, preferably an unsaturated aliphatic group having 3 or more and 30 or less carbon atoms, more preferably an unsaturated aliphatic group having 5 or more and 25 or less carbon atoms, and further more preferably an unsaturated aliphatic group having 8 or more and 20 or less carbon atoms.

The number of double bonds included in the unsaturated aliphatic group is, for example, preferably 1 or more and 3 or less.

Examples of the substituent include the same as exemplified as the substituent of the alkyl group.

Examples of the unsaturated aliphatic group that has a double bond and may have a substituent include a pentadeca-8-ene-1-yl group, a pentadeca-8,11-diene-1-yl group, a pentadeca-8,11,14-triene-1-yl group, a pentadeca-7-ene-1-yl group, a pentadeca-7,10-diene-1-yl group, a pentadeca-7,10,14-triene-1-yl group, and the like.

In General Formula (CDN1), $R^1$ is, for example, preferably a pentadeca-8-ene-1-yl group, a pentadeca-8,11-diene-1-yl group, a pentadeca-8,11,14-triene-1-yl group, a pentadeca-7-ene-1-yl group, a pentadeca-7,10-diene-1-yl group, a pentadeca-7,10,14-triene-1-yl group, and the like.

In General formula (CDN1), as the alkyl group that may have a substituent represented by $R^2$ and the unsaturated aliphatic group that has a double bond and may have a substituent, exemplified alkyl groups that may have a substituent represented by $R^1$ and unsaturated aliphatic groups that have a double bond and may have a substituent are similarly exemplified as, for example, preferable examples.

The compound represented by General Formula (CDN1) may be further modified. For example, the compound may be epoxidized, and from a viewpoint of improving the biodegradation rate of the resin particles, specifically, a compound of a structure in that a hydroxy group having a compound represented by General Formula (CDN1) has been substituted with the following group (EP), that is, a compound represented by General Formula (CDN1-e) is preferable.

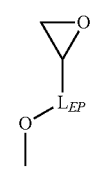

Group (EP)

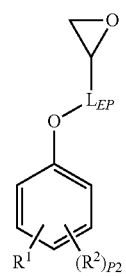

General Formula (CDN1-e)

In the group (EP) and General Formula (CDN1-e), $L_{EP}$ represents a single bond or a divalent linking group. In General Formula (CDN1-e), $R^1$, $R^2$, and P2 each are the same as $R^1$, $R^2$, and P2 in General Formula (CDN1).

In the group (EP) and General Formula (CDN1-e), examples of the divalent linking group represented by $L_{EP}$ include an alkylene group that may have a substituent (for example, preferably an alkylene group having 1 or more and 4 or less carbon atoms), more preferably an alkylene group having 1 carbon atom), a —$CH_2CH_2OCH_2CH_2$— group, and the like.

Examples of the substituent include the same as exemplified as the substituent in $R^1$ of General Formula (CDN1).

The $L_{EP}$ is, for example, preferably a methylene group.

A polymer obtained by the compound represented by General Formula (CDN1) refers to a polymer obtained by polymerizing at least two or more compounds represented by General Formula (CDN1) via or not via a linking group.

Examples of the polymer obtained by polymerizing the compound represented by General Formula (CDN1) include a compound represented by General Formula (CDN2).

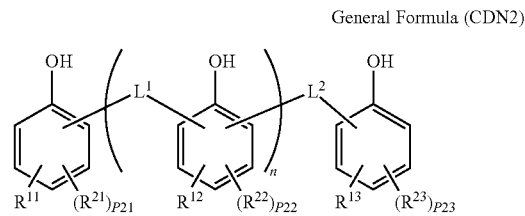

General Formula (CDN2)

In General Formula (CDN2), $R^{11}$, $R^{12}$, and $R^{13}$ each independently represent an alkyl group that may have a substituent, or an unsaturated aliphatic group that has a double bond and may have a substituent. $R^{21}$, $R^{22}$, and $R^{23}$ each independently represent a hydroxy group, a carboxy group, an alkyl group that may have a substituent, or an unsaturated aliphatic group that has a double bond and may have a substituent. P21 and P23 each independently represent an integer of 0 or more and 3 or less, and P22 represents an integer of 0 or more and 2 or less. $L^1$ and $L^2$ each independently represent a divalent linking group. n represents an integer of 0 or more and 10 or less. $R^{21}$ present in plural numbers in a case where P21 is 2 or more, $R^{22}$ present in plural numbers in a case where P22 is 2 or more, and $R^{23}$ present in plural numbers in a case where P23 is 2 or more may be each independently the same groups, or may be different groups. $R^{12}$, $R^{22}$, and $L^1$ present in plural numbers in a case where n is 2 or more may be each independently the same groups, or may be different groups, and P22 present in plural numbers in a case where n is 2 or more may be the same numbers, or may be different numbers.

In General Formula (CDN2), as an alkyl group that may have a substituent represented by $R^{11}$, $R^{12}$, $R^{13}$, $R^{21}$, $R^{22}$, and $R^{23}$ and an unsaturated aliphatic group that has a double bond and may have a substituent, exemplified $R^1$ of General Formula (CDN1) are similarly exemplified as, for example, preferable examples.

In General Formula (CDN2), examples of the divalent linking group represented by $L^1$ and $L^2$ include an alkylene group that may have a substituent (for example, preferably an alkylene group having 2 or more and 30 or less carbon atoms, more preferably an alkylene group having 5 or more and 20 or less carbon atoms), and the like, for example.

Examples of the substituent include the same as exemplified as the substituent in $R^1$ of General Formula (CDN1).

In General Formula (CDN2), n is, for example, preferably 1 or more and 10 or less, and more preferably 1 or more and 5 or less.

The compound represented by General Formula (CDN2) may be further modified. For example, the compound may be epoxidized, and specifically, a compound of a structure in which a hydroxy group of the compound represented by General Formula (CDN2) has been substituted with a group (EP), that is, a compound represented by General Formula (CDN2-e).

General Formula (CDN2-e)

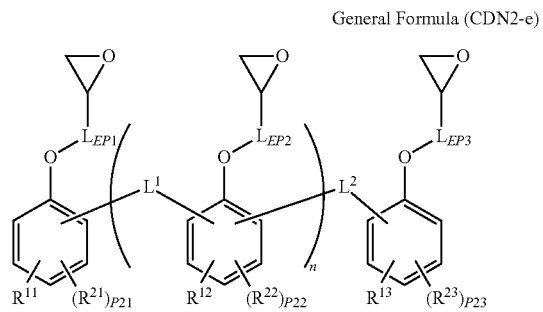

In General Formula (CDN2-e), $R^{11}$, $R^{12}$, $R^{13}$, $R^{21}$, $R^{22}$, $R^{23}$, P21, P22, P23, $L^1$, $L^2$, and n are each independently the same as $R^{11}$, $R^{12}$, $R^{13}$, $R^{21}$, $R^{22}$, $R^{23}$, P21, P22, P23, $L^1$, $L^2$, and n in General Formula (CDN2).

In General Formula (CDN2-e), $L_{EP1}$, $L_{EP2}$, and $L_{EP3}$ each independently represent a single bond or a divalent linking group. $L_{EP2}$ present in plural numbers in a case where n is 2 or more may be the same groups, or may be different groups.

In General Formula (CDN2-e), as the divalent linking group represented by $L_{EP1}$, $L_{EP2}$, and $L_{EP3}$, exemplified divalent linking groups represented by $L_{EP}$, in General Formula (CDN1-e) are simply exemplified as, for example, preferable examples.

The polymer obtained by polymerizing the compound represented by General Formula (CDN1) may be, for example, a polymer obtained by three-dimensionally cross-linking and polymerizing at least three or more compounds represented by General Formula (CDN1) via or not via a linking group. Examples of the polymer obtained by three-dimensionally cross-linking and polymerizing the compound represented by General Formula (CDN1) include a compound represented by the following structural formula, for example.

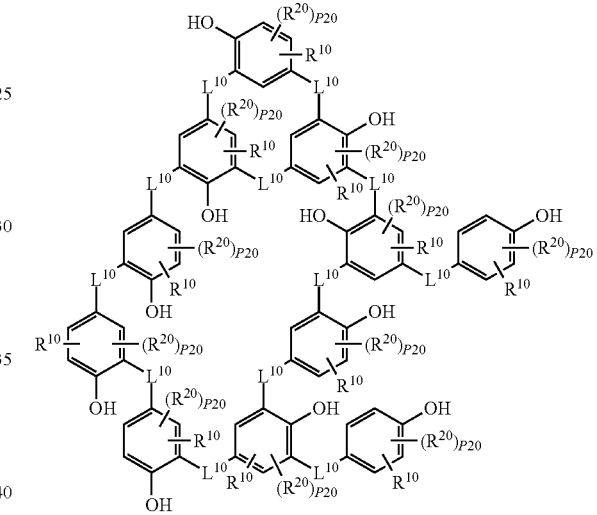

In the structural formula, $R^{10}$, $R^{20}$, and P20 each are the same as $R^1$, $R^2$, and P2 in General Formula (CDN1). $L^{10}$ represents a single bond or a divalent linking group. $R^{10}$, $R^{20}$, and $L^{10}$ present in plural numbers each may be the same groups, or may be different groups. P20 present in plural numbers may be the same numbers, or may be different numbers.

In the structural formula, the divalent linking group represented by $L^{10}$ includes an alkylene group that may have a substituent (for example, preferably an alkylene group having 2 or more and 30 or less carbon atoms, more preferably 5 or more and 20 or less carbon atoms), and the like.

Examples of the substituent include the same as exemplified as the substituent in $R^1$ of General Formula (CDN1).

The compound represented by the structural formula may be further modified, for example, may be epoxidized. Specifically, the compound may be a compound of a structure in which the hydroxy group of the compound represented by the structural formula is substituted with a group (EP), for example, a compound represented by the following structural formula, that is, a polymer obtained by three-dimensionally cross-linking and polymerizing the compound represented by General Formula (CDN1-e).

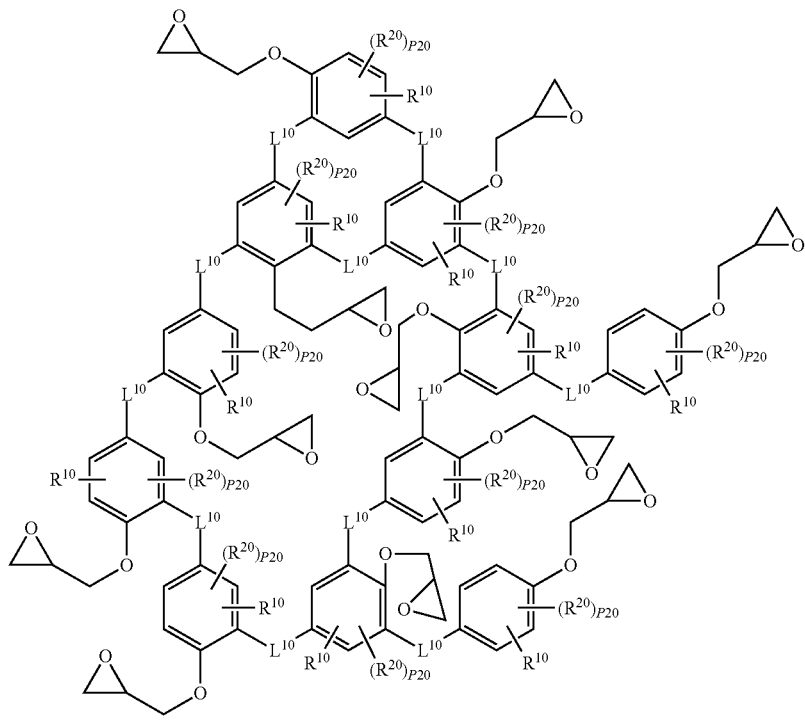

In the structural formula, $R^{10}$, $R^{20}$, and P20 are each independently the same as $R^1$, $R^2$, and P2 in General Formula (CDN1-e). $L^{10}$ represents a single bond or a divalent linking group. $R^{10}$, $R^{20}$, and $L^{10}$ present in plural numbers each may be the same groups, or may be different groups. P20 present in plural numbers may be the same numbers, or may be different numbers.

In the structural formula, the divalent linking group represented by $L^{10}$ includes an alkylene group that may have a substituent (for example, preferably an alkylene group having 2 or more and 30 or less carbon atoms, more preferably 5 or more and 20 or less carbon atoms), and the like.

Examples of the substituent include the same as exemplified as the substituent in $R^1$ of General Formula (CDN1).

The cardanol compound, for example, preferably include a cardanol compound having an epoxy group, and is, for example, more preferably a cardanol compound having an epoxy group, from a viewpoint of improving the transparency of a resin molded body.

As the cardanol compound, a commercially available product may be used. Examples of the commercially available product include NX-2024, Ultra LITE 2023, NX-2026, GX-2503, NC-510, LITE 2020, NX-9001, NX-9004, NX-9007, NX-9008, NX-9201, and NX-9203, manufactured by Cardolite Corporation, LB-7000, LB-7250, and CD-5L, manufactured by Tohoku Chemical Industries, Ltd., and the like. Examples of the commercially available product of the cardanol compound having an epoxy group include NC-513, NC-514S, NC-547, LITE 513E, and Ultra LTE 513, manufactured by Cardolite Corporation, and the like.

A hydroxyl value of the cardanol compound is, for example, preferably 100 mgKOH/g or more, more preferably 120 mgKOH/g or more, and further more preferably 150 mgKOH/g or more, from a viewpoint of improving the biodegradation rate of the resin molded body. The hydroxyl value of the cardanol compound is measured in accordance with a method A of ISO14900.

In a case where a cardanol compound having an epoxy group is used as the cardanol compound, the epoxy equivalent thereof is, for example, preferably 300 or more and 500 or less, more preferably 350 or more and 480 or less, and further more preferably 400 or more and 470 or less, from a viewpoint of improving the transparency of the resin molded body. The epoxy equivalent of the cardanol compound having an epoxy group is measured in accordance with ISO3001.

A molecular weight of the cardanol compound is, for example, preferably 250 or more and 1,000 or less, more preferably 280 or more and 800 or less, and further more preferably 300 or more and 500 or less, from a viewpoint of improving the biodegradation rate of the resin molded body.

One of the cardanol compound may be used alone, or two or more thereof may be used in combination.

A content of the plasticizer is, for example, preferably 0% by mass or more and 50% by mass or less, more preferably 5% by mass or more and 40% by mass or less, and further more preferably 10% by mass or more and 30% by mass or less, with respect to the total amount of the resin particles.

Other Components

The mother particles may contain other components.

Examples of the other components include a plasticizer, a flame retardant, a compatibilizer, a mold release agent, a light fastener, a weather resistant agent, a colorant, a pigment, a modifier, a drip inhibitor, an antistatic agent, a hydrolysis inhibitor, a filler, a reinforcing agent (glass fiber, carbon fiber, talc, clay, mica, glass flake, milled glass, glass beads, crystalline silica, alumina, silicon nitride, aluminum nitride, boron nitride, and the like), an acid acceptor to prevent acetic acid release (oxides such as magnesium oxide and aluminum oxide; metal hydroxides such as magnesium hydroxide, calcium hydroxide, aluminum hydroxide, and hydrotalcite; calcium carbonate; talc; and the like), a reactive trapping agent (for example, epoxy compound, acid anhydride compound, carbodiimides, and the like), and the like.

A content of the other components is, for example, preferably 0% by mass or more and 5% by mass or less, with respect to the total amount of the mother particles. Here, "0% by mass" means that other components are not contained.

The mother particles may contain resins other than the biodegradable resin. However, in a case of containing other resins, a content of other resins with respect to the total amount of the mother particles may be 5% by mass or less, and is, for example, preferably less than 1% by mass. It is, for example, more preferable that other resins are not contained (that is, 0% by mass).

Examples of other resins include known thermoplastic resins in the related art, and specifically include a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyetherimide resin; a polyacetal resin; a polyvinyl acetal resin; a polyketone resin; a polyether ketone resin; a polyetherether ketone resin; a polyaryl ketone resin; a polyether nitrile resin; a liquid crystal resin; a polybenzimidazole resin; a polyparavanate resin; a vinyl polymer or copolymer obtained by polymerizing or copolymerizing one or more vinyl monomers selected from the group consisting of aromatic alkenyl compound, methacrylic acid ester, acrylic acid ester, and vinyl cyanide compound; diene-aromatic alkenyl compound copolymer; vinyl cyanide-diene aromatic alkenyl compound copolymer; aromatic alkenyl compound-diene-vinyl cyanide-N-phenylmaleimide copolymer; vinyl cyanide-(ethylene-diene-propylene (EPDM))-aromatic alkenyl compound copolymer; vinyl chloride resin; chlorinated vinyl chloride resin; and the like.

One of these resins may be used alone, or two or more thereof may be used in combination.

First Layer and Second Layer

The resin particles according to the present exemplary embodiment, for example, preferably have a first layer containing at least one cationic resin of polyalkyleneimine, polyallylamine, or polyvinylamine and a second layer containing an anionic or nonionic hydrophobic compound, on a surface of the mother particles, in this order.

By having the first layer and the second layer, the alkali metal atomic weight A on the resin particle surface is more likely to decrease. Therefore, the storage properties in a solution containing water are further improved.

First Layer

The first layer is a resin layer on a surface of the mother particles. The first layer contains at least one cationic resin of polyalkyleneimine, polyallylamine, and polyvinylamine.

The cationic resin may be any of polyalkyleneimine, polyallylamine, and polyvinylamine, but polyalkyleneimine is, for example, preferable, from a viewpoint of improving the biodegradation rate over time and decreasing the initial biodegradation rate.

The polyalkyleneimine is, for example, preferably polyalkyleneimine having a structural unit including an alkylene group having 1 or more and 6 or less carbon atoms (for example, preferably 1 or more and 4 or less carbon atoms, more preferably 1 or more and 2 or less carbon atoms), and is more preferably polyethyleneimine, from a viewpoint of improving the biodegradation rate over time and decreasing the initial biodegradation rate.

In particular, polyethyleneimine is a compound having high adhesion and high water absorption. This is because an amino group of polyethyleneimine has a hydrogen bond with a hydroxyl group, an ionic bond with a carboxyl group, and a covalent bond with a carbonyl group. This is because polyethyleneimine has a polar group (amino group) and a hydrophobic group (ethylene group) in the structure, and therefore has a property of easily binding different substances.

In addition, polyethyleneimine is a compound having high cationic property. As a result, polyethyleneimine exists as a polycation in water and neutralizes and adsorbs anionic substances.

In addition, polyethyleneimine is a compound having a highly reactive primary amino group or secondary amino group, and thus is a compound having high reactivity. Therefore, polyethyleneimine easily reacts with various compounds.

Therefore, in a case where polyethyleneimine is applied as the polyalkyleneimine, the second layer containing the hydrophobic compound is more strongly coated on the mother particles, and the initial biodegradation rate easily becomes slow while having the biodegradation rate over time.

A number average molecular weight of the cationic resin is, for example, preferably 300 or more and 100,000 or less, more preferably 10,000 or more and 85,000 or less, and further more preferably 50,000 or more and 80,000 or less, from a viewpoint of improving the biodegradation rate over time and decreasing the initial biodegradation rate.

The number average molecular weight of the cationic resin is measured by gel permeation chromatography (GPC apparatus: manufactured by Tosoh Corporation, HLC-8320GPC, column: TSKgel α-M) in terms of polystyrene using tetrahydrofuran.

Second Layer

The second layer is a compound layer on the first layer. The second layer contains an anionic or nonionic compound or a hydrophobic compound.

Examples of the anionic or nonionic compound or the hydrophobic compound include a hydrophobic compound having an anionic group (—COOH (carboxyl group), —SO3H (sulfone group), and the like), a hydrophobic compound not having a cationic group and an anionic group, and the like.

The hydrophobic compound indicates a compound that imparts hydrophobicity (specifically, a water contact angle) to the biodegradable resin particles described later.

Examples of the hydrophobic compound include silicone compound, hydrocarbon compound, fatty acid compound, acrylic resin, polyester resin, urethane resin, and the like.

Among these, from a viewpoint of improving the biodegradation rate over time and decreasing the initial biodegradation rate, at least one selected from the group consisting of a silicone compound, a hydrocarbon compound, a fatty acid compound, an acrylic resin, a polyester resin, and a urethane resin is, for example, preferable.

Examples of the silicone compound include dimethylpolysiloxane, methylpolysiloxane, octamethylcyclotetrasiloxane, decamethylcyclopentanesiloxane, methylcyclopolysiloxane, and various modified silicone oils (alkyl-modified silicone oil, polyether-modified silicone oil, alcohol-modified silicone oil, fluorine-modified silicone oil, amino-modified silicone oil, and the like), MQ resin, silicone rubber, and the like.

Among these, the silicone compound is, for example, preferably at least one selected from the group consisting of dimethylpolysiloxane, methylpolysiloxane, MQ resin, and silicone rubber, from a viewpoint of improving the biodegradation rate over time and decreasing the initial biodegradation rate.

Here, the MQ resin indicates a silicone resin having an M unit that is a monofunctional siloxane unit [(CH3) 3SiO1/2] and a Q unit that is a tetrafunctional siloxane unit [SiO4/2].

Examples of the commercially available silicone compound include a silicone compound (KM-902, KM-903, KM-910, KM-9729, POLON-MN-ST, KM-9737A, KM-9782, KM-9738A, KM-752T, POLON-MF-33, KM-9717, X-51-1302M (MQ resin), POLON-MF-56, KM-2002-L-1, KM-2002-T, KM-9772, KM-9749, POLON-MF-40, KM-9729, X-52-1133, and the like, manufactured by Shin-Etsu Chemical Co., Ltd.), and a silicone compound (BELSIL DM3112VP) manufactured by Wacker Asahikasei Silicone Co., Ltd.

Examples of the hydrocarbon compound include petroleum wax (paraffin wax, microcrystalline wax, petrolatum wax, and the like), synthetic hydrocarbon wax (polyethylene wax, polypropylene wax, polybutene wax, Fischer Tropsch wax, and the like), and the like.

Among these, from a viewpoint of improving the biodegradation rate over time and decreasing the initial biodegradation rate, the hydrocarbon compound is, for example, preferably at least one selected from the group consisting of paraffin wax, microcrystalline wax, polyethylene wax, and polypropylene wax.

Examples of the commercially available hydrocarbon compound include microcrystalline wax (EMUSTAR-0001 and the like) manufactured by Nippon Seiro Co., Ltd., paraffin wax (EMUSTAR-0135 and the like) manufactured by Nippon Seiro Co., Ltd., paraffin wax (AQUACER497 and the like) manufactured by BYK Co., Ltd., polyethylene wax (AQUACER507, AQUACER840, AQUACER1547, AQUACER272, and the like) manufactured by BYK Co., Ltd., polyethylene wax (Hitech E-2213, Hitech E-6324, and the like) manufactured by Toho Chemical Industry Co., Ltd., polypropylene wax (AQUACER593 and the like) manufactured by BYK Co., ltd., polypropylene (Hitech P-9018, Hitech P-5060P, and the like) manufactured by Toho Chemical Industry Co., Ltd., and the like.

Examples of the fatty acid compound include vegetable oils containing fatty acids (castor oil, tung oil, flaxseed oil, shortening, corn oil, soybean oil, sesame oil, rapeseed oil, sunflower oil, rice oil, camellia oil, coconut oil, palm oil, walnut oil, olive oil, peanut oil, almond oil, jojoba oil, cacao butter, shea butter, neem oil, safflower oil, wood wax, candelilla wax, rice wax, carnauba wax, and the like).

Among these, from a viewpoint of improving the biodegradation rate over time and decreasing the initial biodegradation rate, the fatty acid compound is, for example, preferably at least one selected from the group consisting of carnauba wax, rice wax, candelilla wax, palm wax, castor oil wax, soybean oil wax, and sunflower oil wax.

Examples of the commercially available fatty acid compound include carnauba wax (EMUSTAR-0413) (carnauba wax) manufactured by Nippon Seiro Co., Ltd., rice wax (AQUASPROUT-7300 and the like) manufactured by Nippon Seiro Co., Ltd., palm wax (AQUASPROUT-7100 and the like) manufactured by Nippon Seiro Co., Ltd., castor oil wax (AQUASPROUT-7500 and the like) manufactured by Nippon Seiro Co., Ltd., soybean oil wax (AQUASPROUT-7200 and the like) manufactured by Nippon Seiro Co., Ltd., sunflower oil wax (AQUASPROUT-7400 and the like) manufactured by Nippon Seiro Co., Ltd., palm oil wax (Kakko Ace TKE and the like) manufactured by Nippon Seiro Co., Ltd., and the like.

Examples of the acrylic resin include known acrylic resins such as a polymer of acrylic acid and a polymer of an acrylic acid alkyl ester.

Examples of the commercially available acrylic resin include acrylic resins (3WX-2015, 3MF-320, 3MF-333, 3MF-407, and the like) manufactured by Taisei Fine Chemical Co., Ltd. and acrylic resins (Coat SFC-6440, Boncoat CE-6270, Boncoat CE-6400, Boncoat CF-2800, and the like) manufactured by DIC Corporation.

Examples of the polyester resin include known polyester resins such as a polycondensate of a polyvalent carboxylic acid and a polyhydric alcohol and a ring-opened polycondensate of cyclic lactam.

Examples of the commercially available polyester resin include polyester resins (A-110F, A-160P, A-520, A-613D, A-615GE, A-640, A-645GH, A-647GEX, and the like) manufactured by Takamatsu Oil & Fat Co., Ltd.

Examples of the urethane resin include known urethane resins such as polyester-based polyurethane, polyether-based polyurethane, and polycarbonate-based polyurethane. In addition, as the urethane resin, a material having a urethane polymer shell layer around the core of the acrylic polymer may be used.

Examples of the commercially available urethane resin include urethane resins (WEM-031U, WEM-200U, WEM-321U, WEM-3000, WBR-016U, WBR-2101, and the like) manufactured by Taisei Fine Chemical Co., Ltd.

Content of Each Layer

In the biodegradable resin particles according to the present exemplary embodiment, from a viewpoint of improving the biodegradation rate over time and decreasing the initial biodegradation rate, a mass ratio of a coating amount of the cationic resin in the first layer to a coating amount of the hydrophobic compound in the second layer (coating amount of cationic resin/coating amount of hydrophobic compound) is, for example, preferably 0.05 or more and 20 or less, more preferably 0.1 or more and 10 or less, and further more preferably 0.1 or more and 3 or less.

In addition, a content of the cationic resin with respect to the mother particles (coating amount of the first layer with respect to the total amount of the mother particles) is, for example, preferably 0.01% by mass or more and 20% by mass or less, more preferably 0.1% by mass or more and 10% by mass or less, and further more preferably 0.1% by mass or more and 3% by mass or less.

By setting a content of the cationic resin with respect to the mother particles within the above numerical value range, the alkali metal atomic weight A on the resin particle surface is likely to be further decreased. Therefore, the storage properties in a solution containing water are further improved.

In addition, from a viewpoint of further improving the storage properties in a solution containing water, the content of the hydrophobic compound with respect to the mother particles (coating amount of the second layer with respect to the total amount of the mother particles) is, for example, preferably 0.05% by mass or more and 15% by mass or less, more preferably 0.1% by mass or more and 10% by mass or less, and further more preferably 0.1% by mass or more and 3% by mass or less.

Here, each coating amount of the cationic resin and the hydrophobic compound (that is, each coating amount of the first layer and the second layer) is measured as follows. The coating amount of the cationic resin is obtained by the difference between the treated amount of the cationic resin and the cationic resin obtained by drying the supernatant after the treatment. Similarly, the coating amount of the hydrophobic compound is obtained by the difference between the treated amount of the hydrophobic compound and the hydrophobic compound obtained by drying the supernatant after the treatment.

Properties of Resin Particles

Particle Size

A volume average particle size of the biodegradable resin particles is, for example, preferably 3 µm or more and 100 µm or less, more preferably 5 µm or more and 70 µm or less, and further more preferably 8 µm or more and 60 µm or less.

In a case where the particle size of the granules is 3 µm or more, the number of particles per unit weight does not become too large, and a decrease in the biodegradation rate is suppressed. On the other hand, in a case where the particle size of the biodegradable resin particles is 100 µm or less, a specific surface area becomes high and the biodegradation rate is further improved.

Therefore, a volume average particle size of the granules is, for example, preferably in the range.

A large-diameter side number particle size distribution index GSDv of the biodegradable resin particles is, for example, preferably 1.5 or less, more preferably 1.3 or less, and further more preferably 1.2 or less.

In a case where the particle size distribution of the biodegradable resin particles is brought close to uniform, regular hydrolysis proceeds by giving a certain contact opportunity with water, and the biodegradation rate is further improved.

The volume average particle size and the large diameter side particle size distribution index GSDp of the biodegradable resin particles are measured as follows.

A particle size is measured by an LS particle size distribution measuring apparatus "Beckman Coulter LS13 320 (manufactured by Beckman Coulter)", the cumulative distribution of the particle size is drawn from the small diameter side on a volume basis, and the particle size that becomes 50% of accumulation is obtained as the volume average particle size.

On the other hand, the cumulative distribution of particle size is drawn from the small diameter side on a volume basis, and the particle size that becomes 50% of accumulation is defined as the number average particle diameter D50v, and the particle size that becomes 84% of accumulation is defined as the number particle size D84v. Then, the large-diameter side number particle size distribution index GSDv is calculated by the formula GSDv=(D84v/D50v)$^{1/2}$.

Atomic Weight A and Atomic Weight B

An alkali metal atomic weight A present on a resin particle surface with respect to a total atomic weight present on the resin particle surface, which is measured by X-ray photoelectron spectroscopy, and an alkali metal atomic weight B present on resin particles with respect to the total atomic weight present in the resin particles, which is measured by fluorescent X-ray spectroscopy, satisfy a relationship of $0 \leq (A/B) < 0.15$ and $0.005$ atomic $\% \leq B \leq 0.5$ atomic %.

From a viewpoint of further improving the storage properties in a solution containing water, the atomic weight A and the atomic weight B are not limited and preferably satisfy $0 \leq (A/B) \leq 0.12$, more preferably satisfy $0 \leq (A/B) \leq 0.10$, and further more preferably satisfy $0 \leq (A/B) \leq 0.07$.

In addition, from a viewpoint of improving biodegradability, the atomic weight B is not limited and preferably satisfies 0.05 atomic $\% \leq B \leq 0.40$ atomic %, and more preferably satisfies 0.10 atomic $\% \leq B \leq 0.35$ atomic %, and further more preferably satisfies 0.15 atomic $\% \leq B \leq 0.30$ atomic %.

The alkali metal is not limited and preferably includes Na.

Here, an atomic weight $A_{Na}$ of Na present on a resin particle surface with respect to a total atomic weight present on the resin particle surface and an atomic weight $B_{Na}$ of Na present on the resin particles with respect to the total atomic weight present on the resin particles, which is measured by fluorescent X-ray spectroscopy, are not limited and preferably satisfy a relationship of $0 \leq (A_{Na}/B_{Na}) < 0.15$ and $0.005$ atomic $\% \leq B_{Na} \leq 0.5$ atomic %.

In an action of improving biodegradability of a biodegradable resin, among the alkali metals, Na tends to be high. Therefore, as the alkali metal includes Na, the biodegradability of the resin particles is further improved. As the atomic weight $A_{Na}$ and the atomic weight $B_{Na}$ satisfy the relationship, a proportion of Na in the alkali metal contained in the resin particles becomes high, and thus the biodegradability of the resin particles is further improved.

Calculation of the atomic weight A is performed as follows.

"PHI5000 Versa Probe II manufactured by ULVAC-PHI, Inc." is used as an X-ray photoelectron spectrometer, and monochromatic AlKα rays are used as an X-ray source, and an acceleration voltage is set to 15 kV to perform measurement. At this time, only a particle outermost surface is measured by adjusting a sample inclination angle and setting an incident angle θ is set to 15°, the number of each atom is obtained based on the measured spectrum of each atom, and an alkali metal atomic weight with respect to the total atomic weight in the measurement region is calculated. The alkali metal atomic weight A (atomic %) is a percentage of the total amount of detected alkali metal atoms with respect to the detected total atomic weight.

Calculation of the atomic weight B is performed as follows.

Using a fluorescent X-ray analyzer (XRF 1500, manufactured by Shimadzu Corporation), qualitative and quantitative analysis measurements are performed under the conditions of an X-ray output of 40 V, 70 mA, a measurement area of 10 mmφ, and a measurement time of 15 minutes. Here, elements to be analyzed are all the elements in the measurement region, and the atomic weight of each element is calculated, referring to separately prepared calibration line data that allows quantification of each element based on the measured spectrum of each atom to calculate an alkali metal atomic weight with respect to the total atomic weight in the measurement region. The alkali metal atomic weight B (atomic %) is a percentage of the total amount of the detected alkali metal atoms with respect to the detected total atomic weight.

Relationship Between [AL1], [AL2], and [AL3]

[AL1], [AL2], and [AL3] are defined as follows.

[AL1]: Alkali metal atomic weight on a resin particle surface measured by X-ray photoelectron spectroscopy

[AL2]: Alkali metal atomic weight on a surface after etching a range of 2 mm square of the resin particle surface with an argon gas cluster ion gun of an output of 5 kV for 5 minutes

[AL3]: Alkali metal atomic weight on a surface after etching a range of 2 mm square of a resin particle surface with an argon gas cluster ion gun of an output of 5 kV for 30 minutes Then, the resin particles according to the present exemplary embodiment satisfy a relationship of [AL1]<[AL3]<[AL2].

From a viewpoint of producing resin particles having biodegradability and having excellent storage properties in a solution containing water, [AL1], [AL2], and [AL3] are, for example, preferable as follows.

[AL1] is, for example, preferably 0 atomic % or more and 0.08 atomic % or less, more preferably 0 atomic % or more and 0.06 atomic % or less, and further more preferably 0 atomic % or more and 0.03 atomic % or less.

[AL2] is, for example, preferably 0.1 atomic % or more and 10 atomic % or less, more preferably 0.2 atomic % or more and 9 atomic % or less, and further more preferably 0.3 atomic % or more and 8 atomic % or less.

[AL3] is, for example, preferably 0.09 atomic % or more and 4 atomic % or less, more preferably 0.09 atomic % or more and 3 atomic % or less, and further more preferably 0.09 atomic % or more and 2 atomic % or less.

From a viewpoint of producing resin particles having more biodegradability and excellent storage properties in a solution containing water, [AL1], [AL2], and [AL3] are not limited and preferably satisfy the following relationship.

An absolute value of the difference between [AL1] and [AL3] (|[AL1]−[AL3]|) is, for example, preferably 0.01 or more and 4 or less, more preferably 0.01 or more and 3 or less, and further more preferably 0.01 or more and 2 or less.

An absolute value of the difference between [AL3] and [AL2] (|[AL3]−[AL2]|) is, for example, preferably 0.01 or more and 9.91 or less, more preferably 0.01 or more and 8.91 or less, and further more preferably 0.01 or more and 7.91 or less.

The alkali metal atomic weight is measured by XPS (X-ray photoelectron spectroscopy).

A procedure for measuring the alkali metal atomic weights [AL1], [AL2], and [AL3] is the same as the procedure of the atomic weight A.

Specifically, [AL1] is measured by the same procedure as the procedure of the atomic weight A (that is, [AL1] is the same as the atomic weight A). Then, the alkali metal atomic weight [AL2] is measured under the same XPS measurement conditions as the conditions of the atomic weight A on a surface after etching a range of 2 mm square of the resin particle surface with an argon gas cluster ion gun of an output of 5 kV for 5 minutes. In addition, the alkali metal atomic weight [AL3] is measured under the same XPS measurement conditions as the conditions of the atomic weight A on a surface after etching a range of 2 mm square of the resin particle surface with an argon gas cluster ion gun of an output of 5 kV for 30 minutes.

In addition, an etching method for the resin particle surface will be described.

Specifically, a range of 2 mm square of the outermost resin particle surface is etched with an argon gas cluster ion gun of an output of 5 kV.

Etching Conditions
Etching gun: Argon gas cluster ion gun
Acceleration voltage: 5 kV
Sweeping region: 2 mm×2 mm
Rate: 20 nm/min (in terms of polyester)
Method for Producing Resin Particles
Examples of a method for producing resin particles include the following methods.

(1) A kneading and pulverizing method of obtaining granules by kneading each component, and pulverizing and classifying obtained kneaded matters (2) A dry production method of obtaining granules by changing a shape of the granules obtained by the kneading and pulverizing method with a mechanical impact force or thermal energy (3) An aggregation and coalescence method of obtaining granules by mixing a particle dispersion solution of each component, and aggregating and heat-fusing particles in the dispersion solution (4) A dissolution suspension method of granulating granules including each component by suspending an organic solvent in which each component is dissolved in an aqueous solvent (5) A kneading and dissolution method of granulating by kneading each component and a binder, extruding thereof into pellets, and agitating the obtained pellets in a solvent dissolving only the binder As a method for producing resin particles, from a viewpoint of ensuring that the atomic weight A and the atomic weight B satisfy the relationship of $0 \leq (A/B) < 0.15$ and $0.005$ atomic $\% \leq B \leq 0.5$ atomic %, the method of (4) is, for example, preferable.

In production of the resin particles by the method of (4), there is, for example, preferably included a step (hereinafter, referred to as Step A) of obtaining coarse particles by suspending an organic solvent in which each component is dissolved in an aqueous solvent, adding an alkali metal element source to the suspension solution, agitating thereof for 2 hours or more and 5 hours or less in a temperature range of 60° C. or higher and 90° C. or lower, for example, and removing the solvent.

Then, after Step A, a step (hereinafter, referred to as Step B) of performing filtration after adding a dilute acid to the coarse particles is, for example, preferably included.

In addition, after Step B, a step (hereinafter, referred to as Step C) of performing dispersion of coarse particles obtained in Step B in water and filtration of a dispersion solution is, for example, preferably included.

Step A

The alkali metal element source to be added to the suspension solution is, for example, preferably a hydroxide containing an alkali metal element.

Specific examples of the hydroxide containing an alkali metal element include lithium hydroxide, sodium hydroxide, potassium hydroxide, rubidium hydroxide, and the like.

An addition amount of the alkali metal element source is, for example, preferably 2% by mass or more and 20% by mass or less, and more preferably 3% by mass or more and 10% by mass or less, with respect to a total solid content contained in the suspension solution.

Here, as a method for adding the alkali metal element source to the suspension solution, a method of adding an aqueous solution containing the alkali metal element source to the suspension solution is, for example, preferable.

Step B

The dilute acid added to the coarse particles obtained in Step A is, for example, preferably a dilute hydrochloric acid. A concentration of hydrogen chloride with respect to the total dilute hydrochloric acid is, for example, preferably 9% by mass or more and 11% by mass or less.

An addition amount of the dilute acid added is, for example, preferably 100 parts by mass or more and 3,000 parts by mass or less, more preferably 200 parts by mass or more and 1,000 parts by mass or less, and further more preferably 400 parts by mass or more and 800 parts by mass or less, with respect to 100 parts by mass of the coarse particles obtained in Step A.

In Step B, the method for filtering the dispersion solution containing coarse particles and a dilute acid is not particularly limited, and a known filtration method is applied. The same applies to the filtration method applied in Step C.

Step C

An amount of water for dispersing the coarse particles obtained in Step B is, for example, preferably 100 parts by mass or more and 3,000 parts by mass or less, more preferably 200 parts by mass or more and 1,000 parts by mass or less, and further more preferably 400 parts by mass or more and 800 parts by mass or less, with respect to 100 parts by mass of the coarse particles obtained in Step B.

In step C, a series of procedures consisting of dispersion of the coarse particles obtained in Step B in water and filtration of the dispersion solution are, for example, preferably performed a plurality of times under the same conditions. In a case where the series of procedures are performed a plurality of times, the number of times is, for example, preferably 2 times or more and 4 times or less.

After Step C, the residue after filtration is dried to obtain resin particles.

Examples of the method for producing the resin particles having the first layer and the second layer include the following methods, for example.

First Step

In First step, mother particles are prepared.

Examples of the method for producing mother particles include methods (1) to (5) for producing the resin particles.

Subsequently, an aqueous dispersion solution in which the obtained mother particles are dispersed is prepared. Before preparing the aqueous dispersion solution, acid washing of the mother particles may be, for example, performed.

Subsequently, the aqueous dispersion solution, the aqueous dispersion solution in which the mother particles are dispersed, and an aqueous solution containing a cationic resin are mixed with one another. As a result, for example, a hydroxyl group of the resin contained in the mother particles reacts with an amine site of the cationic resin to form the first layer.

Second Step

In Second step, the mother particles on which the first layer is formed are extracted from the mixed solution. The extraction of the mother particles is, for example, performed by filtering the mixed solution. The extracted mother particles may be, for example, washed with water. With this, an unreacted cationic resin is removed.

Subsequently, after preparing an aqueous dispersion solution in which the mother particles are dispersed, the aqueous dispersion solution and an emulsion solution of an anionic or nonionic hydrophobic compound are mixed with each other. With this, the emulsion of the hydrophobic compound is adsorbed on the first layer of the mother particles.

Then, in a case where the mixed solution is dried, the emulsion of the hydrophobic compound is broken, and the hydrophobic compound is filmed on the first layer. With this, a second layer is formed.

By the above steps, the resin particles according to the present exemplary embodiment are obtained.

Use

Examples of the use of the resin particles according to the present exemplary embodiment include cosmetic base materials, rolling materials, abrasives, scrubbing agents, display spacers, beads molding materials, light diffusing particles, resin strengthening agents, refractive index control agents, biodegradation accelerators, fertilizers, water-absorbent particles, toner particles, granules of anti-blocking particles, and the like.

EXAMPLES

Examples will be described below, but the present invention is not limited to these Examples. In the following description, unless otherwise specified, "parts" and "%" are all based on mass.

Preparation of Each Material

The following materials are prepared.

Biodegradable Resin

CAB1: Eastman Chemical "CAB381-20", cellulose acetate butyrate, weight average polymerization degree 890, acetyl group substitution degree 1.05, butyryl group substitution degree 1.74

CAB2: Eastman Chemical "CAB171-15", cellulose acetate butyrate, weight average polymerization degree 754, acetyl group substitution degree 2.07, butyryl group substitution degree 0.73

CAP: Eastman Chemical "CAP482-20", cellulose acetate propionate, weight average polymerization degree 716, acetyl group substitution degree 0.18, propionyl group substitution degree 2.49

PA12: Daicel Evonik "DAIAMID", Polyamide 12

PA11: Arkema "Rilsan", Polyamide 11

PBS: "BioPBS" manufactured by Mitsubishi Chemical Corporation, polybutylene succinate DAC: "L-50" manufactured by Daicel Corporation, cellulose diacetate, weight average polymerization degree 570

Plasticizer

DBA: "Plasticizer 40" manufactured by Kao Corporation, diisobutyl adipate

CDN: "NX-2026" manufactured by Cardolite Corporation, cardanol, molecular weight=298 to 305

ATBC: "Citroflex A4" manufactured by Morimura Bros., Inc., acetyl tributyl citrate DPS: "NIKKOL DIS" manufactured by Nikko Chemicals, isopropyl sebacate Cationic Resin of the First Layer A number average molecular weight of each cationic resin is described in the table.

PEI1: Polyethyleneimine

PEI2: Polyethyleneimine

PEI3: Polyethyleneimine

PAA: "PAA-25" manufactured by Nittobo Medical Co., Ltd., polyallylamine

PBAM: "PVAM-0595B" manufactured by Mitsubishi Chemical Corporation, polyvinylamine Anionic or Cationic Hydrophobic Compound of the Second Layer EMUSTAR-0413: Carnauba wax manufactured by Nippon Seiro Co., Ltd.

POLON-MN-ST: Dimethyl silicone manufactured by Shin-Etsu Chemical Co., Ltd.

KM-9717: MQ resin manufactured by Shin-Etsu Chemical Co., Ltd.

BELSIL DM3112VP: Dimethicone manufactured by Wacker Asahikasei Silicone Co., Ltd.

Hitech E-2213: Polyethylene wax manufactured by Toho Chemical Industry Co., Ltd.

Hitech P-9018: Polypropylene wax manufactured by Toho Chemical Industry Co., Ltd.

3MF-320: Acrylic resin manufactured by Taisei Fine Chemical Co., Ltd.

A-647GEX: Polyester resin manufactured by Takamatsu Oil & Fat Co., Ltd.

WBR-016U: Urethane resin manufactured by Taisei Fine Chemical Co., Ltd.

Examples 1 to 11, 15 to 33, 34 to 36, and 38 to 41, Comparative Examples 1, 2, and 6 to 8

Preparation of Mother Particles

The biodegradable resin and the plasticizer shown in Table 1 are completely dissolved in 800 g of methyl ethyl ketone in a total amount of 200 g at a composition ratio shown in Table 1. This is added to an aqueous solution prepared by dispersing calcium carbonate in the amount shown in Table 1, 2 g of carboxymethyl cellulose, and 200 g of methyl ethyl ketone in 600 g of distilled water, and the mixture is agitated with a high-speed emulsifier (manufactured by IKA) at a rotation speed of 8,000 rpm for 5 minutes. 200 g of 1 mol/L sodium hydroxide is added thereto, and the mixture is heated to 80° C. and agitated for 3 hours to remove methyl ethyl ketone.

Subsequently, 10% dilute hydrochloric acid in the amount shown in Table 1 is added to dissolve calcium carbonate. Then, filtration is performed to recover the solid content.

Then, the recovered solid content is dispersed in pure water in the amount shown in Table 1 and a series of procedures for performing filtration are performed the number of times shown in Table 1 to obtain a mother particle slurry.

Preparation of Resin Particles 500 parts of a slurry of mother particles adjusted to have a solid content of 20% are prepared. A cationic resin solution in the amount shown in Table 1 is added to the solid content (100 parts) contained in this slurry in terms of pure content, and the mixture is agitated under a condition of 25° C. for 1 hour. After the agitating is completed, the residue is filtered and dispersed in pure water again to prepare 500 parts adjusted so that the solid content is 20%. A hydrophobic compound in the amount shown in Table 1 is added to the solid content (100 parts) contained in this slurry in terms of pure content and is agitated under a condition of 25° C. for 1 hour. After the agitating is completed, the residue is filtered and the solid content is freeze-dried to obtain biodegradable resin particles.

Through the above steps, biodegradable resin particles are obtained.

Example 12

Resin particles are obtained in the same manner as in Example 1 except that 200 g of 1 mol/L sodium hydroxide added at the time of preparing the mother particles is changed to 120 g of 1 mol/L lithium hydroxide.

Example 13

Resin particles are obtained in the same manner as in Example 1 except that 200 g of 1 mol/L sodium hydroxide added at the time of preparing the mother particles is changed to 280 g of 1 mol/L potassium hydroxide.

Example 14

A mother particle slurry is obtained in the same manner as in Example 1 except that 200 g of 1 mol/L sodium hydroxide added at the time of preparing the mother particles is changed to 515 g of 1 mol/L rubidium hydroxide.

Example 37, Comparative Examples 3 to 5

Preparation of Resin Particles

The biodegradable resin and the plasticizer shown in Table 1 are completely dissolved in 800 g of methyl ethyl ketone in a total amount of 200 g at a composition ratio shown in Table 1. This is added to an aqueous solution prepared by dispersing calcium carbonate in the amount shown in Table 1, 2 g of carboxymethyl cellulose, and 200 g of methyl ethyl ketone in 600 g of distilled water, and the mixture is agitated with a high-speed emulsifier (manufactured by IKA) at a rotation speed of 8,000 rpm for 5 minutes. 200 g of 1 mol/L sodium hydroxide is added thereto, and the mixture is heated to 80° C. and agitated for 3 hours to remove methyl ethyl ketone.

Subsequently, 10% dilute hydrochloric acid in the amount shown in Table 1 is added to dissolve calcium carbonate. Then, filtration is performed to recover the solid content.

Then, the recovered solid content is dispersed in pure water in the amount shown in Table 1, a series of procedures for filtering are performed the number of times shown in Table 1, and the solid content is freeze-dried to obtain resin particles.

Evaluation

Measurement of Atomic Weight and Particle Size

The obtained resin particles are measured for atomic weight A, atomic weight B, [AL1], [AL2], [AL3], and number average particle diameter D50v according to the above-described method.

Evaluation of Storage Properties: Measurement of Mass Reduction Rate in Distilled Water 5 g of the obtained resin particles are sealed in a bag obtained by processing a nylon net (nylon mesh #508/585-1 μm, manufactured by As One Corporation) having an opening of 1 μm, placed in pure water at 70° C., and left to stand for 14 days, and the mass of the nylon net containing the resin particles before and after standing is measured, the mass reduction rate is calculated, and the storage properties are evaluated based on the following evaluation criteria.

A: Mass reduction amount is less than 5%

B: Mass reduction amount is 5% or more and less than 10%

C: Mass reduction amount is 10% or more and less than 30%

D: Mass reduction amount is 30% or more

Biodegradability Evaluation: Measurement of Mass Reduction Rate in Compost 5 g of the obtained resin particles are sealed in a bag obtained by processing a nylon net (nylon mesh #508/585-1 μm, manufactured by As One Corporation) having an opening of 1 μm, buried in compost (compost mushroom bed, manufactured by Iris Ohyama Inc.) containing 1% by mass or more and less than 3% by mass of nitrogen in the total amount, 0.1% by mass or more and less than 1% by mass of phosphoric acid in the total amount, and 2% by mass or more and less than 4% by mass of added base in the total amount, and having 20 or more and less than 30 of a carbon-nitrogen ratio (C/N ratio), left to stand in a dry oven set at 55° C. for 14 days, and the mass of the nylon net containing resin particles before and after standing is measured, the mass reduction rate is calculated, and storage properties are evaluated based on the following evaluation criteria.

A: Mass reduction amount is 95% or more

B: Mass reduction amount is 90% or more and less than 95%

C: Mass reduction amount is more than 70% and less than 90%

D: Mass reduction amount is 70% or less

TABLE 1-1

| | Mother particles | | | | First layer (cationic resin) | | Coating amount C (%) (to mother particles) | Second layer (hydrophobic compound) |
| | Biodegradable resin | | Plasticizer | | | | | |
| | Type | Parts | Type | Parts | Type | Mn | | Type |
|---|---|---|---|---|---|---|---|---|
| Example 1 | CAB1 | 100 | DBA | 20 | PEI1 | 70000 | 1 | EMUSTAR-0413 |
| Example 2 | CAB2 | 100 | DBA | 20 | PEI1 | 70000 | 1 | EMUSTAR-0413 |
| Example 3 | CAB2 | 100 | DBA | 20 | PEI1 | 70000 | 1 | EMUSTAR-0413 |
| Example 4 | CAB1 | 100 | DBA | 20 | PEI1 | 70000 | 0.1 | EMUSTAR-0413 |
| Example 5 | CAB2 | 100 | DBA | 20 | PEI1 | 70000 | 10 | EMUSTAR-0413 |
| Example 6 | CAB1 | 100 | DBA | 20 | PEI1 | 70000 | 1 | EMUSTAR-0413 |
| Example 7 | CAB2 | 100 | DBA | 20 | PEI1 | 70000 | 1 | EMUSTAR-0413 |
| Example 8 | CAB2 | 100 | DBA | 20 | PEI2 | 300 | 1 | EMUSTAR-0413 |
| Example 9 | CAB1 | 100 | DBA | 20 | PEI3 | 100000 | 1 | EMUSTAR-0413 |
| Example 10 | CAB2 | 60 | DBA | 50 | PEI1 | 70000 | 1 | EMUSTAR-0413 |
| Example 11 | CAB1 | 80 | DBA | 30 | PEI1 | 70000 | 1 | EMUSTAR-0413 |
| Example 12 | CAB1 | 100 | DBA | 20 | PEI1 | 70000 | 1 | EMUSTAR-0413 |
| Example 13 | CAB1 | 100 | DBA | 20 | PEI1 | 70000 | 1 | EMUSTAR-0413 |
| Example 14 | CAB1 | 100 | DBA | 20 | PEI1 | 70000 | 1 | EMUSTAR-0413 |
| Example 15 | CAB 2 | 100 | DBA | 20 | PEI1 | 70000 | 1 | POLON-MN-ST |
| Example 16 | CAB 1 | 100 | DBA | 20 | PEI1 | 70000 | 1 | KM-9717 |
| Example 17 | CAB 2 | 100 | DBA | 20 | PEI1 | 70000 | 1 | BELSILDM3112VP |
| Example 18 | CAB 1 | 100 | DBA | 20 | PEI1 | 70000 | 1 | E-2213 |
| Example 19 | CAB 2 | 100 | DBA | 20 | PEI1 | 70000 | 1 | P-9018 |
| Example 20 | CAB 1 | 100 | DBA | 20 | PEI1 | 70000 | 1 | 3MF-320 |
| Example 21 | CAB 2 | 100 | DBA | 20 | PEI1 | 70000 | 1 | A-647GEX |
| Example 22 | CAB 1 | 100 | DBA | 20 | PEI1 | 70000 | 1 | WBR-016U |
| Example 23 | CAB 2 | 100 | DBA | 20 | PEI1 | 70000 | 0.05 | EMUSTAR-0413 |
| Example 24 | CAB 1 | 100 | DBA | 20 | PEI1 | 70000 | 15 | EMUSTAR-0413 |

| | Second layer (hydrophobic compound) | | | | | | |
| | Type | Coating amount D (%) (to mother particles) | Coating amount ratio C/D | Calcium carbonate amount (g) | 10% dilute hydrochloric acid amount (g) | Pure water amount at the time of redispersion | Redispersion-filtration repeating times (times) |
|---|---|---|---|---|---|---|---|
| Example 1 | Carnauba wax | 1 | 1 | 200 | 2000 | 4000 | 3 |
| Example 2 | Carnauba wax | 1 | 1 | 50 | 500 | 500 | 1 |
| Example 3 | Carnauba wax | 1 | 1 | 30 | 300 | 500 | 1 |
| Example 4 | Carnauba wax | 1 | 0.1 | 200 | 2000 | 3000 | 2 |
| Example 5 | Carnauba wax | 1 | 10 | 200 | 2000 | 4000 | 3 |
| Example 6 | Carnauba wax | 0.1 | 10 | 200 | 2000 | 1000 | 1 |
| Example 7 | Carnauba wax | 10 | 0.1 | 200 | 2000 | 4000 | 2 |
| Example 8 | Carnauba wax | 1 | 1 | 100 | 1000 | 3000 | 1 |
| Example 9 | Carnauba wax | 1 | 1 | 100 | 1000 | 4000 | 3 |
| Example 10 | Carnauba wax | 1 | 1 | 200 | 2000 | 4000 | 3 |

TABLE 1-1-continued

| | | | | | | | |
|---|---|---|---|---|---|---|---|
| Example 11 | Carnauba wax | 1 | 1 | 200 | 2000 | 3000 | 2 |
| Example 12 | Carnauba wax | 1 | 1 | 200 | 2000 | 4000 | 3 |
| Example 13 | Carnauba wax | 1 | 1 | 200 | 2000 | 4000 | 3 |
| Example 14 | Carnauba wax | 1 | 1 | 200 | 2000 | 4000 | 3 |
| Example 15 | Dimethyl silicone | 1 | 1 | 200 | 2000 | 1000 | 1 |
| Example 16 | MQ resin | 1 | 1 | 200 | 2000 | 1000 | 1 |
| Example 17 | dimethicone | 1 | 1 | 200 | 2000 | 1000 | 1 |
| Example 18 | Polyethylene wax | 1 | 1 | 200 | 2000 | 1000 | 1 |
| Example 19 | Polypropylene wax | 1 | 1 | 200 | 2000 | 1000 | 1 |
| Example 20 | Acrylic resin | 1 | 1 | 200 | 2000 | 1000 | 1 |
| Example 21 | Polyester resin | 1 | 1 | 200 | 2000 | 1000 | 1 |
| Example 22 | Urethane resin | 1 | 1 | 200 | 2000 | 1000 | 1 |
| Example 23 | Carnauba wax | 1 | 0.05 | 150 | 1500 | 1000 | 1 |
| Example 24 | Carnauba wax | 1 | 15 | 150 | 1500 | 4000 | 2 |

TABLE 1-2

| | Mother particles | | | | First layer (cationic resin) | | Coating amount C (%) (to mother particles) | Second layer (hydrophobic compound) |
|---|---|---|---|---|---|---|---|---|
| | Biodegradable resin | | Plasticizer | | | | | |
| | Type | parts | Type | Parts | Type | Mn | | Type |
| Example 25 | CAB1 | 100 | DBA | 20 | PEI1 | 70000 | 1 | EMUSTAR-0413 |
| Example 26 | CAB1 | 100 | DBA | 20 | PEI1 | 70000 | 1 | EMUSTAR-0413 |
| Example 27 | CAB2 | 100 | DBA | 20 | PAA | 25000 | 1 | EMUSTAR-0413 |
| Example 28 | CAB2 | 100 | DBA | 20 | PVAM | 100000 | 1 | EMUSTAR-0413 |
| Example 29 | CAP | 100 | DBA | 20 | PEI1 | 70000 | 1 | EMUSTAR-0413 |
| Example 30 | CAP | 100 | CDN | 20 | PEI1 | 70000 | 1 | EMUSTAR-0413 |
| Example 31 | CAP | 100 | ATBC | 20 | PEI1 | 70000 | 1 | EMUSTAR-0413 |
| Example 32 | CAP | 100 | DPS | 20 | PEI1 | 70000 | 1 | EMUSTAR-0413 |
| Example 33 | CAB1 | 100 | — | — | PEI1 | 70000 | 1 | EMUSTAR-0413 |
| Comparative Example 1 | CAP | 100 | — | — | PEI1 | 70000 | 1 | — |
| Comparative Example 2 | CAP | 100 | CDN | 20 | — | — | — | EMUSTAR-0413 |
| Comparative Example 3 | CAP | 100 | CDN | 20 | — | — | — | — |
| Comparative Example 4 | PA12 | 100 | — | — | — | — | — | — |
| Comparative Example 5 | PA11 | 100 | — | — | — | — | — | — |
| Comparative Example 6 | CAB2 | 100 | DBA | 20 | PEI1 | 70000 | 1 | EMUSTAR-0413 |
| Comparative Example 7 | CAB2 | 100 | DBA | 20 | PEI1 | 70000 | 1 | EMUSTAR-0413 |
| Example 34 | CAB1 | 100 | DBA | 20 | PEI1 | 70000 | 1 | EMUSTAR-0413 |
| Comparative Example 8 | CAB2 | 100 | DBA | 20 | PEI1 | 70000 | 1 | EMUSTAR-0413 |
| Example 35 | PBS | 100 | DBA | 20 | PEI1 | 70000 | 1 | EMUSTAR-0413 |
| Example 36 | DAC | 100 | DBA | 20 | PEI1 | 70000 | 1 | EMUSTAR-0413 |
| Example 37 | CAB2 | 100 | DBA | 20 | — | — | — | EMUSTAR-0413 |
| Example 38 | CAB1 | 100 | DBA | 20 | PEI1 | 70000 | 0.005 | EMUSTAR-0413 |
| Example 39 | CAB1 | 100 | DBA | 20 | PEI1 | 70000 | 0.01 | EMUSTAR-0413 |
| Example 40 | CAB2 | 100 | DBA | 20 | PEI1 | 70000 | 20 | EMUSTAR-0413 |
| Example 41 | CAB1 | 100 | DBA | 20 | PEI1 | 70000 | 21 | EMUSTAR-0413 |

TABLE 1-2-continued

| | | Second layer (hydrophobic compound) | | | | | |
|---|---|---|---|---|---|---|---|
| | Type | Coating amount D (%) (to mother particles) | Coating amount ratio C/D | Calcium carbonate amount (g) | 10% dilute hydrochloric acid amount (g) | Pure water amount at the time of redispersion | Redispersion-filtration repeating times (times) |
| Example 25 | Carnauba wax | 0.05 | 20 | 200 | 2000 | 4000 | 2 |
| Example 26 | Carnauba wax | 15 | 0.07 | 200 | 2000 | 4000 | 2 |
| Example 27 | Carnauba wax | 1 | 1 | 100 | 1000 | 3000 | 2 |
| Example 28 | Carnauba wax | 1 | 1 | 100 | 1000 | 3000 | 2 |
| Example 29 | Carnauba wax | 1 | 1 | 200 | 2000 | 2000 | 2 |
| Example 30 | Carnauba wax | 1 | 1 | 50 | 500 | 2000 | 2 |
| Example 31 | Carnauba wax | 1 | 1 | 50 | 500 | 4000 | 3 |
| Example 32 | Carnauba wax | 1 | 1 | 50 | 500 | 4000 | 3 |
| Example 33 | Carnauba wax | 1 | 1 | 200 | 2000 | 4000 | 3 |
| Comparative Example 1 | — | — | — | 200 | 2000 | 4000 | 3 |
| Comparative Example 2 | Carnauba wax | 1 | — | 200 | 2000 | 200 | 1 |
| Comparative Example 3 | — | — | — | 200 | 2000 | 4000 | 3 |
| Comparative Example 4 | — | — | — | 200 | 2000 | 200 | 1 |
| Comparative Example 5 | — | — | — | 200 | 2000 | 4000 | 3 |
| Comparative Example 6 | Carnauba wax | 1 | 1 | 200 | 2000 | 300 | 1 |
| Comparative Example 7 | Carnauba wax | 1 | 1 | 200 | 2000 | 4000 | 3 |
| Example 34 | Carnauba wax | 1 | 1 | 200 | 2000 | 4000 | 3 |
| Comparative Example 8 | Carnauba wax | 1 | 1 | 200 | 2000 | 1000 | 2 |
| Example 35 | Carnauba wax | 1 | 1 | 200 | 2000 | 4000 | 3 |
| Example 36 | Carnauba wax | 1 | 1 | 200 | 2000 | 1000 | 2 |
| Example 37 | — | — | — | 200 | 2000 | 3000 | 3 |
| Example 38 | Carnauba wax | 1 | 1 | 200 | 2000 | 1000 | 1 |
| Example 39 | Carnauba wax | 1 | 1 | 200 | 2000 | 1000 | 2 |
| Example 40 | Carnauba wax | 1 | 1 | 200 | 2000 | 4000 | 3 |
| Example 41 | Carnauba wax | 1 | 1 | 200 | 2000 | 4000 | 3 |

TABLE 2-1

| | XPS | | XRF | | | | | | | | |
|---|---|---|---|---|---|---|---|---|---|---|---|
| | Alkali metal type | Atomic weight A (atomic %) | Alkali metal type | Atomic weight B (atomic %) | A/B | AL1 (atomic %) | AL2 (atomic %) | AL3 (atomic %) | D50v (μm) | Storage properties | Bio-degradability |
| Example 1 | Na | 0.000 | Na | 0.010 | 0.00 | 0.00 | 0.13 | 0.10 | 7 | A | B |
| Example 2 | Na | 0.050 | Na | 0.450 | 0.11 | 0.05 | 7.90 | 1.80 | 50 | C | A |
| Example 3 | Na | 0.050 | Na | 0.420 | 0.12 | 0.05 | 7.20 | 1.30 | 90 | C | A |
| Example 4 | Na | 0.000 | Na | 0.150 | 0.00 | 0.00 | 1.35 | 0.05 | 6 | C | A |
| Example 5 | Na | 0.000 | Na | 0.020 | 0.00 | 0.00 | 0.18 | 0.01 | 7 | A | B |
| Example 6 | Na | 0.050 | Na | 0.450 | 0.11 | 0.05 | 4.05 | 0.14 | 10 | C | A |
| Example 7 | Na | 0.000 | Na | 0.250 | 0.00 | 0.00 | 2.25 | 0.08 | 8 | A | A |
| Example 8 | Na | 0.000 | Na | 0.330 | 0.00 | 0.00 | 2.97 | 0.10 | 22 | C | A |
| Example 9 | Na | 0.000 | Na | 0.020 | 0.00 | 0.00 | 0.18 | 0.01 | 20 | B | B |
| Example 10 | Na | 0.000 | Na | 0.030 | 0.00 | 0.00 | 0.27 | 0.01 | 7 | A | C |
| Example 11 | Na | 0.000 | Na | 0.080 | 0.00 | 0.00 | 0.72 | 0.02 | 8 | A | B |
| Example 12 | Li | 0.000 | Li | 0.030 | 0.00 | 0.00 | 0.27 | 0.01 | 9 | A | B |
| Example 13 | K | 0.000 | K | 0.040 | 0.00 | 0.00 | 0.36 | 0.01 | 6 | A | B |
| Example 14 | Rb | 0.000 | Rb | 0.050 | 0.00 | 0.00 | 0.45 | 0.02 | 7 | A | B |
| Example 15 | Na | 0.000 | Na | 0.420 | 0.00 | 0.00 | 3.78 | 0.13 | 8 | B | A |
| Example 16 | Na | 0.050 | Na | 0.380 | 0.13 | 0.05 | 3.42 | 0.11 | 7 | C | A |
| Example 17 | Na | 0.000 | Na | 0.430 | 0.00 | 0.00 | 3.87 | 0.13 | 9 | B | A |
| Example 18 | Na | 0.000 | Na | 0.440 | 0.00 | 0.00 | 3.96 | 0.13 | 7 | B | A |
| Example 19 | Na | 0.000 | Na | 0.350 | 0.00 | 0.00 | 3.15 | 0.11 | 7 | B | A |
| Example 20 | Na | 0.000 | Na | 0.320 | 0.00 | 0.00 | 2.88 | 0.10 | 6 | B | A |
| Example 21 | Na | 0.000 | Na | 0.350 | 0.00 | 0.00 | 3.15 | 0.11 | 8 | B | A |
| Example 22 | Na | 0.000 | Na | 0.310 | 0.00 | 0.00 | 2.79 | 0.09 | 7 | B | A |

TABLE 2-1-continued

|  | XPS | | XRF | | | | | | | | |
|---|---|---|---|---|---|---|---|---|---|---|---|
|  | Alkali metal type | Atomic weight A (atomic %) | Alkali metal type | Atomic weight B (atomic %) | A/B | AL1 (atomic %) | AL2 (atomic %) | AL3 (atomic %) | D50v (μm) | Storage properties | Bio-degradability |
| Example 23 | Na | 0.050 | Na | 0.410 | 0.12 | 0.05 | 3.69 | 0.12 | 15 | C | A |
| Example 24 | Na | 0.000 | Na | 0.051 | 0.00 | 0.00 | 0.46 | 0.02 | 18 | A | A |

TABLE 2-2

|  | XPS | | XRF | | | | | | | | |
|---|---|---|---|---|---|---|---|---|---|---|---|
|  | Alkali metal type | Atomic weight A (atomic %) | Alkali metal type | Atomic weight B (atomic %) | A/B | AL1 (atomic %) | AL2 (atomic %) | AL3 (atomic %) | D50v (μm) | Storage properties | Bio-degradability |
| Example 25 | Na | 0.000 | Na | 0.040 | 0.00 | 0.00 | 0.36 | 0.01 | 9 | C | A |
| Example 26 | Na | 0.000 | Na | 0.030 | 0.00 | 0.00 | 0.27 | 0.01 | 7 | A | A |
| Example 27 | Na | 0.000 | Na | 0.060 | 0.00 | 0.00 | 0.54 | 0.02 | 25 | B | A |
| Example 28 | Na | 0.000 | Na | 0.130 | 0.00 | 0.00 | 1.17 | 0.04 | 22 | B | A |
| Example 29 | Na | 0.000 | Na | 0.160 | 0.00 | 0.00 | 1.44 | 0.05 | 6 | B | A |
| Example 30 | Na | 0.000 | Na | 0.230 | 0.00 | 0.00 | 2.07 | 0.07 | 40 | B | C |
| Example 31 | Na | 0.000 | Na | 0.030 | 0.00 | 0.00 | 0.27 | 0.01 | 60 | B | C |
| Example 32 | Na | 0.000 | Na | 0.040 | 0.00 | 0.00 | 0.36 | 0.01 | 70 | B | C |
| Example 33 | Na | 0.000 | Na | 0.030 | 0.00 | 0.00 | 0.27 | 0.01 | 10 | A | B |
| Comparative Example 1 | — | — | — | — | — | — | — | — | 8 | D | B |
| Comparative Example 2 | Na | 0.400 | Na | 1.000 | 0.40 | 0.40 | 2.00 | 4.00 | 7 | D | A |
| Comparative Example 3 | Na | 1.500 | Na | 1.000 | 1.50 | 1.50 | 1.30 | 1.40 | 7 | D | A |
| Comparative Example 4 | Na | 0.000 | Na | 0.050 | 0.00 | 0.00 | 0.03 | 0.06 | 7 | A | D |
| Comparative Example 5 | Na | 0.000 | Na | 0.080 | 0.00 | 0.00 | 0.05 | 0.09 | 7 | A | D |
| Comparative Example 6 | Na | 0.700 | Na | 4.660 | 0.15 | 0.70 | 6.21 | 7.32 | 9 | D | A |
| Comparative Example 7 | Na | 0.000 | Na | 0.004 | 0.00 | 0.00 | 0.002 | 0.003 | 8 | B | D |
| Example 34 | Na | 0.000 | Na | 0.005 | 0.00 | 0.00 | 0.15 | 0.10 | 7 | B | C |
| Comparative Example 8 | Na | 0.070 | Na | 0.510 | 0.14 | 0.07 | 0.62 | 0.65 | 9 | D | A |
| Example 35 | Na | 0.000 | Na | 0.300 | 0.00 | 0.00 | 2.70 | 0.09 | 11 | B | C |
| Example 36 | Na | 0.050 | Na | 0.350 | 0.14 | 0.05 | 3.15 | 0.11 | 8 | C | B |
| Example 37 | Na | 0.000 | Na | 0.100 | 0.00 | 0.00 | 0.13 | 0.11 | 10 | C | B |
| Example 38 | Na | 0.070 | Na | 0.800 | 0.09 | 0.07 | 7.20 | 0.24 | 8 | C | A |
| Example 39 | Na | 0.050 | Na | 0.400 | 0.13 | 0.05 | 3.60 | 0.12 | 9 | B | A |
| Example 40 | Na | 0.000 | Na | 0.500 | 0.00 | 0.00 | 4.50 | 0.15 | 7 | A | B |
| Example 41 | Na | 0.000 | Na | 0.400 | 0.00 | 0.00 | 3.60 | 0.12 | 9 | A | C |

From the above results, it is recognized that the resin particles of the present example are resin particles having biodegradability and excellent storage properties in a solution containing water.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Resin particles comprising:
    mother particles containing a biodegradable resin,
    wherein an alkali metal atomic weight A present on a resin particle surface with respect to a total atomic weight present on the resin particle surface, which is measured by an X-ray photoelectron spectroscopy, and an alkali metal atomic weight B present in the resin particles with respect to the total atomic weight present on the resin particles, which is measured by a fluorescent X-ray spectroscopy, satisfy a relationship of $0 \leq (A/B) < 0.15$ and $0.005$ atomic $\% \leq B \leq 0.5$ atomic %,
    wherein an alkali metal atomic weight [AL1] on a resin particle surface prior to an etching on the resin particle surface, which is measured by the X-ray photoelectron spectroscopy, an alkali metal atomic weight [AL2] on a surface after etching a range of 2 mm square of the resin particle surface with an argon gas cluster ion gun of an output of 5 kV for 5 minutes, and an alkali metal atomic weight [AL3] on a surface after etching a range of 2 mm square of the resin particle surface with an argon gas cluster ion gun of an output of 5 kV for 30 minutes satisfy a relationship of [AU]<[AL3]<[AL2],
wherein the resin particles further comprises: a first layer containing at least one cationic resin of polyalkyleneimine, polyallylamine, or polyvinylamine on a surface of the mother particles; and a second layer containing an anionic or nonionic hydrophobic compound, in this order.

2. The resin particles according to claim 1,
wherein the alkali metal includes Na.

3. The resin particles according to claim 2,
wherein a content of cellulose acylate is 50% by mass or more with respect to a total amount of the mother particles.

4. The resin particles according to claim 3,
wherein the cellulose acylate is a cellulose acylate having at least two or more acyl groups.

5. The resin particles according to claim 4,
wherein the cellulose acylate having at least two or more acyl groups is cellulose acetate butyrate.

6. The resin particles according to claim 1,
wherein a content of cellulose acylate is 50% by mass or more with respect to a total amount of the mother particles.

7. The resin particles according to claim 6,
wherein the cellulose acylate is a cellulose acylate having at least two or more acyl groups.

8. The resin particles according to claim 7,
wherein the cellulose acylate having at least two or more acyl groups is cellulose acetate butyrate.

9. The resin particles according to claim 1,
wherein a coating amount of the first layer is 0.01% by mass or more and 20% by mass or less with respect to the total amount of the mother particles.

* * * * *